US012039135B2

(12) United States Patent
Seo et al.

(10) Patent No.: US 12,039,135 B2
(45) Date of Patent: Jul. 16, 2024

(54) METHOD AND APPARATUS FOR DETECTING OBJECT POSITION USING SENSOR

(71) Applicant: HYUNDAI MOBIS CO., LTD., Seoul (KR)

(72) Inventors: Jun Seong Seo, Yongin-si (KR); Sung Hyun Park, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/351,541

(22) Filed: Jul. 13, 2023

(65) Prior Publication Data
US 2024/0061529 A1 Feb. 22, 2024

(30) Foreign Application Priority Data
Aug. 22, 2022 (KR) .................. 10-2022-0104855

(51) Int. Cl.
*G06F 3/041* (2006.01)
*G06F 3/042* (2006.01)
(Continued)

(52) U.S. Cl.
CPC .......... *G06F 3/04186* (2019.05); *G06F 3/042* (2013.01); *G06F 3/04817* (2013.01); *G06F 3/0488* (2013.01); *G06F 2203/04108* (2013.01)

(58) Field of Classification Search
CPC ............ G06F 3/04186; G06F 3/04817; G06F 3/04842; G06F 3/042; G06F 3/0488; G06F 3/0418; G06F 3/041; G06F 2203/04108; G06F 2203/04801; G06F 2203/04101; G06F 2203/04804
(Continued)

(56) References Cited

U.S. PATENT DOCUMENTS

2017/0017344 A1*  1/2017  Kuribayashi ....... G06F 3/04842
2019/0243527 A1*  8/2019  Kuribayashi ....... G06F 3/04817

FOREIGN PATENT DOCUMENTS

EP  2985678 A1 *  2/2016  ............. G06F 3/017
KR  20110055810 A *  5/2011  ............ G06F 3/0412
(Continued)

OTHER PUBLICATIONS

English Translation KR-20110055810-A, pp. 1-7 (Year: 2024).*
English Translation KR-20170068829-A, pp. 1-9 (Year: 2024).*

Primary Examiner — Jimmy H Nguyen
(74) Attorney, Agent, or Firm — NovoTechIP International PLLC

(57) ABSTRACT

A method and apparatus for detecting including: resetting a preset offset value based on a detection region in which an object approaching a display is first detected among a plurality of detection regions predetermined by a sensor having a sensing element linearly disposed in parallel with the display; displaying at least one ghost menu icon around an original menu icon on the display screen by determining whether a calibration mode is ON; determining whether the ghost menu icon has been selected by a user; increasing or decreasing, when the ghost menu icon is selected by the user, the reset offset value based on the a position of the selected ghost menu; and correcting a position of an object detected by the sensor based on the increased or decreased offset value.

20 Claims, 8 Drawing Sheets

(51) Int. Cl.
*G06F 3/04817* (2022.01)
*G06F 3/0488* (2022.01)

(58) Field of Classification Search
USPC .................................................. 345/175, 173
See application file for complete search history.

(56) References Cited

FOREIGN PATENT DOCUMENTS

| KR | 10-1080512 B1 | 11/2011 | |
|----|----|----|----|
| KR | 20170068829 A * | 6/2017 | ............. G06F 3/017 |
| KR | 10-2305458 B1 | 9/2021 | |

* cited by examiner

---- : ACTUAL SYSTEM RECOGNIZING REGION

METHOD AND APPARATUS FOR DETECTING OBJECT POSITION USING SENSOR

CROSS-REFERENCE TO RELATED APPLICATIONS

The present application claims priority to Korean Patent Application No. 10-2022-0104855, filed Aug. 22, 2022, the entire contents of which is incorporated herein for all purposes by this reference.

TECHNICAL FIELD

The present invention relates to position detection using an infrared (IR) sensor and, more particularly, to a method and an apparatus for correcting an error of detected position when detecting the position of an object approaching a display screen using a linear IR sensor.

BACKGROUND

Optical sensor technology tracks direction or coordinates by emitting light from an emitter and detecting the returning signal from a receiver. More recently, a technology has been developed to detect the position of an object by generating light and measuring the time taken to emit and reflect the light. By applying this technology, it is possible to implement the technology, such as popping up a menu in the region where the user's finger is pointing by measuring the position of the pointing finger at a position adjacent to the display screen.

On the other hand, in conventional optical sensor technology, the strength of a signal may be determined by the amount of light emitted and reflected. In this case, the strength of the signal is determined by the area of the target from which the light is reflected, which in the case of a human hand varies depending on whether the hand being measured is the right or left hand, the angle of the arm depending on where the user is seated, and the shape of hand pointing at the screen. Thus, determining the position of the object may also cause an error.

Korean Patent Registration No. 10-2305458 (Registration date: Sep. 16, 2021) "Finger point correction method for recognizing gesture and apparatus therefor" tracks the center coordinates of a reflector using data on reflected light received when correcting finger points using optical sensor technology and calculates the correction value of a specific finger based on the relationship value between the tracked center coordinates and a specific finger. However, there is a problem in that it may not be inaccurate since the correction value is calculated by calculating a numerical value in the method mentioned above, and it may not verify whether the correction is incorrect.

On the other hand, Korean Patent Registration No. 10-1080512 (Registration date: Oct. 31, 2011) "Touch screen compensation system and method thereof" displays a specific point on the LCD for calibration and allows the user to touch the displayed point to calculate the correction value by using the difference between the displayed coordinates and the touched coordinates. In such a method, there is a problem in that the direction of the finger touching the LCD is not considered.

Accordingly, there is a need for IR sensor recognition position correction technology that corrects the position measurement value of the finger approaching the screen in consideration of the direction of the finger approaching the screen in the art.

SUMMARY

Therefore, the present invention has been made in view of the above problems, and it is a technical object of the present invention to provide an algorithm that automatically corrects an error between a recognized position and an actual position when recognizing the region being touched by a user on a screen using an optical sensor.

Another technical object of the present invention is to provide an algorithm that accurately measures the position of a finger changing according to the shape of the user's hand when various users operate a touch screen.

It is still another technical object of the present invention to provide a technology for correcting a sensing region that changes according to a driver and a passenger when operating a touch screen in a vehicle.

To accomplish the above objects, according to one aspect of the present invention, there is provided a method for detecting a position according to an embodiment of the present invention including: resetting a preset offset value based on a detection region in which an object approaching a display is first detected among a plurality of detection regions predetermined by a sensor having a sensing element linearly disposed in parallel with the display; displaying at least one ghost menu icon around an original menu icon on the display screen by determining whether a calibration mode is ON; determining whether the ghost menu icon has been selected by a user; increasing or decreasing, when the ghost menu icon is selected by the user, the reset offset value based on the a position of the selected ghost menu; and correcting a position of an object detected by the sensor based on the increased or decreased offset value.

Here, the ghost menu may be displayed in at least one region to the left side or right side of the original menu icon.

In the resetting the offset value, in the case of the detection region in which the object is first detected located in the leftmost region of the plurality of detection regions, the offset value may be set to −1.

In the resetting the offset value, in the case of the detection region in which the object is first detected located in the rightmost region of the plurality of detection regions, the offset value may be set to +1.

In the increasing or decreasing the reset offset value, in the case of the selected ghost menu icon is located to the left of the original menu icon, the reset offset value may be decremented by 1.

In the increasing or decreasing the reset offset value, in the case of the selected ghost menu icon is located to the left of the original menu icon, the reset offset value is incremented by 1.

In the correcting the position of the object, a region corresponding to a value obtained by subtracting the increased or decreased offset value from the value corresponding to the sensing region in which the object is detected in the sensor may be determined as the region in which the object is located.

The method for detecting the position may further include shifting a position of the user menu based on a detection region in which the object is first detected when the object approaches the display screen.

In the shifting the position of the user menu, in the case of the detection region in which the object is first detected located in the leftmost region of the plurality of detection regions, the user menu may be shifted to the left side of the display screen.

In the shifting the position of the user menu, in the case of the detection region in which the object is first detected located in the rightmost region of the plurality of detection regions, the user menu may be shifted to the right side of the display screen.

In addition, a position detection apparatus according to an embodiment of the present invention including: a display part displaying information on a screen; a sensor arranged in parallel with the display part, and the sensing element detecting a position of an object approaching the display part among a plurality of detection regions preset in a linearly disposed sensor; and a processor resetting a preset offset value based on the detection region in which the object is first detected when the object approaches the display part, determining whether calibration mode is in an ON state, displaying at least one ghost menu icon around the original menu icon on the display screen, determining whether the ghost menu icon is selected by a user, increasing or decreasing, when the ghost menu icon is selected by user, the rest offset value based on a position of the selected ghost menu icon, and correcting a position of an object detected by the sensor based on the increased or decreased offset value.

Here, the ghost menu may be displayed in at least one region to the left side or right side of the original menu icon.

Here, the processor may set the offset value to −1, when the detection region in which the object is first detected located in the leftmost region of the plurality of detection regions.

The processor may set the offset value to +1, when the detection region in which the object is first detected located in the rightmost region of the plurality of detection regions.

The processor may subtract 1 from the reset offset value, when the selected ghost menu icon is located to the left side of the original menu icon.

The processor may add 1 to the preset offset value, when the selected ghost menu icon is located to the right side of the original menu icon.

The processor may determine a region where the object is located as a region corresponding to a value obtained by subtracting the increased or decreased offset value from a value corresponding to a sensing region where the object is detected by the sensor.

The process may shift a position of the user menu based on a detection region in which the object is first detected when the object approaches the display screen.

The processor may shift the user menu to the left side of the display screen when the detection region in which the object is first detected located in the leftmost region of the plurality of detection regions.

The processor may shift the user menu to the right side of the display screen when the detection region in which the object is first detected located in the rightmost region of the plurality of detection regions.

Various embodiments of the present invention described above may provide an algorithm that automatically corrects an error between a recognized and actual position when recognizing a region touched by a user on a touch screen.

In addition, the algorithm, which may accurately measure the position of a finger changing according to the shape of the user's hand when various users operate the touch screen, may be provided.

In addition, a technology that corrects a sensing region that changes according to a driver and a passenger when operating a touch screen in a vehicle may be provided.

Advantages which may be obtained in this specification are not limited to the aforementioned advantages, and various other advantages may be evidently understood by those skilled in the art to which the present invention pertains from the following description.

DETAILED DESCRIPTION

Figure 1:
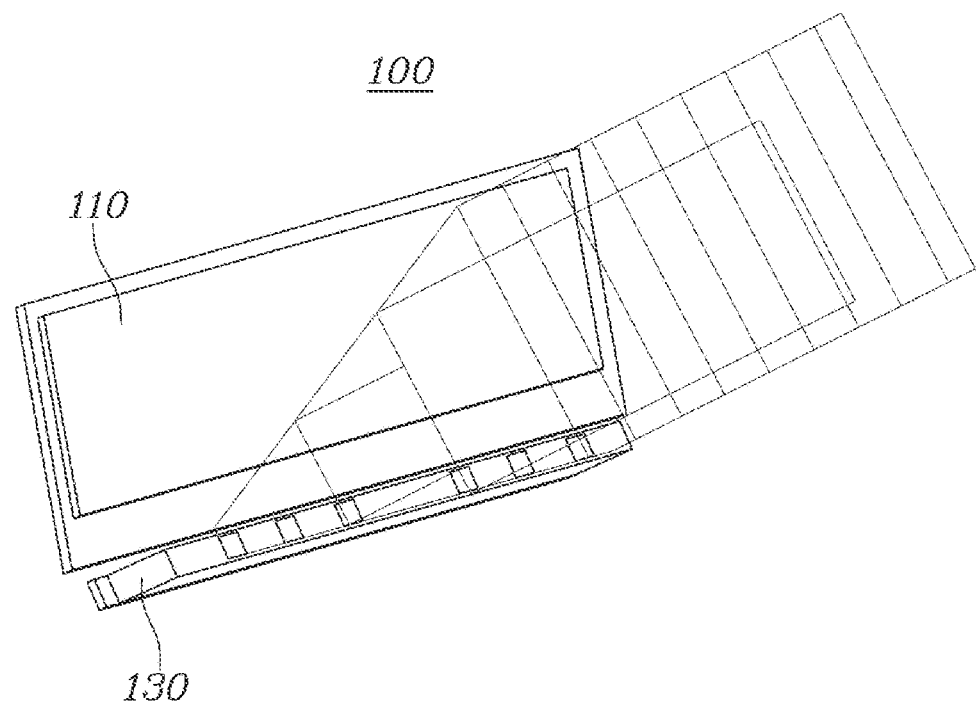
FIG. 1 illustrates an external configuration of a position detection apparatus according to an embodiment of the present invention.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. In the following description, with respect to constituent elements used in the following description, suffixes "module" and "unit" are given in consideration of only facilitation of description and do not have meaning or functions discriminated from each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and spirit of the present invention.

Terms such as "first" and "second" may be used to describe various components, but the components should not be limited by the above terms. In addition, the above terms are used only for the purpose of distinguishing one component from another.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it will be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

FIG. 1 illustrates an external configuration of a position detection apparatus according to an embodiment of the present invention.

Referring to FIG. 1, the position detection apparatus 100 according to the present embodiment includes a display part 110 and a linear sensor 130.

The display part 110 displays information on a screen. For example, the display part 110 may be a display screen of audio, video, and navigation (AVN) system disposed between driver's seat and passenger's seat of a vehicle. For example, the display part 110 may display a navigation screen for guiding directions to a driver in the vehicle.

For example, the linear sensor 130 may use a plurality of linearly disposed infrared (IR) sensors arranged in parallel with the display part 110 at the bottom of the display part 110 to detect the position or movement of a finger approaching the display part 110. The linear sensor 130 includes at least one light-emitting means disposed linearly and a plurality of light-receiving means disposed linearly. The linear sensor 130 may detect a finger approaching the display part 110 using the principle that when the object, such as a finger (hereinafter the object to be detected is assumed to be a finger, for ease of the description), approaches the display part 110 located at the top, infrared light emitted by the light emitting means is reflected by the finger and detected by the light receiving means.

Figure 2:
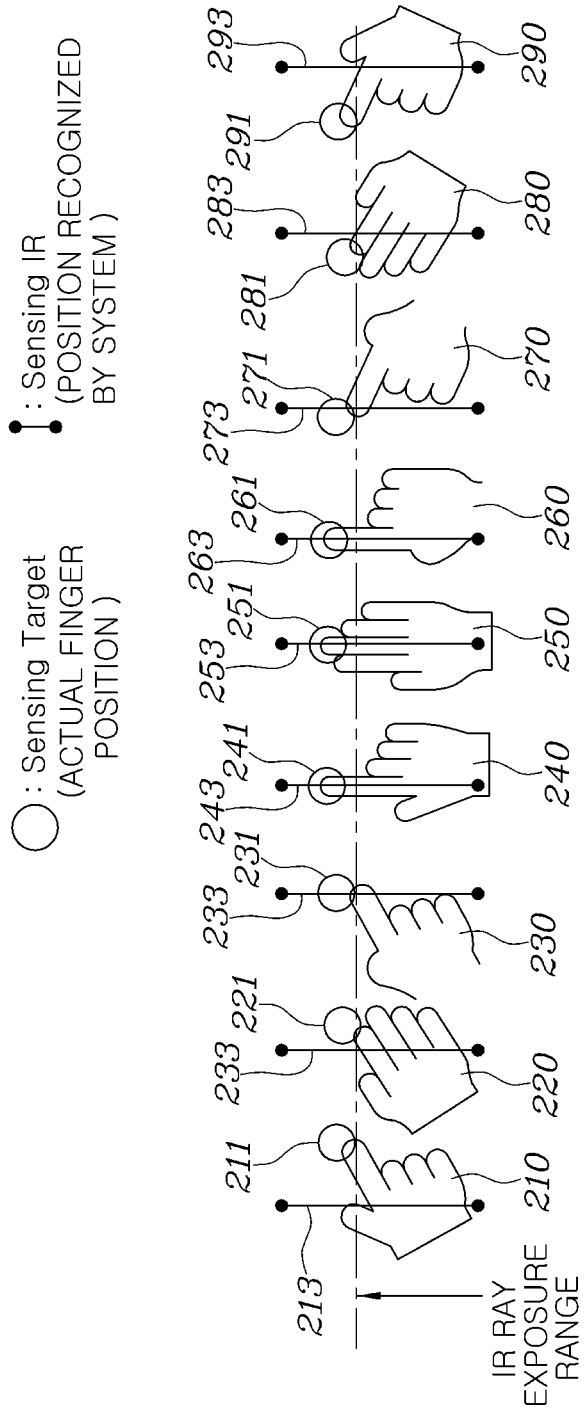
FIG. 2 is an exemplary diagram illustrating a position of a finger measured from an IR sensor according to a position of a hand approaching a screen in the position detection apparatus in FIG. 1.

FIG. 2 is an exemplary diagram illustrating a position of a finger measured from an IR sensor according to a position of a hand approaching a screen in the position detection apparatus in FIG. 1.

Referring to FIG. 2, the linear sensor 130 of the position detection apparatus 100 in FIG. 1 recognizes the finger position approaching the display part 110. The actual finger positions 211, 221, 281, and 291, and the positions measured by the IR sensor 130 213, 223, 283, and 293 may differ depending on whether the user's hand is approached from the left 210, 220, and 230, the center 240, 250, and 260, or the right 270, 280, and 290. In addition, depending on the shape of fingers approaching the display part 110, the actual finger positions 211, 221, 281, and 291 and the positions measured by the IR sensor 130 213, 223, 283, and 293 may differ depending on whether the index finger is used with the thumb opened 210, 240, and 270, the index or middle finger is used with all fingers opened 220, 250, and 280, or only the index finger is used with the thumb folded 230, 260, and 290.

Table 1 below shows the accuracy of the IR sensor 130 based on the direction in which the user's hand approaches the display part 110 and the shape of the hand.

TABLE 1

| Hand used (seated position) | Use right hand (driver) | | |
|---|---|---|---|
| Shape of hand | Thumb and index finger | Opened hand | Index finger |
| Accuracy | X | Δ | ○ |
| Hand used (seated position) | Use center access | | |
| Shape of hand | Thumb and index finger | Opened hand | Index finger |
| Accuracy | ○ | ○ | ○ |
| Hand used (seated position) | Use left hand (passenger) | | |
| Shape of hand | Index finger | Opened hand | Thumb and index finger |
| Accuracy | ○ | Δ | X |

In Table 1 above, the accuracy is labeled as '○', 'Δ', and 'X' in order of increasing accuracy, and the display part 110 is labeled as right-handed for a driver approaching from the left and left-handed for a passenger approaching from the right. In addition, when the finger approaching the display part 110 is using the index finger with the thumb opened, it is denoted as "thumb and index finger" when the index or middle finger is used with all fingers opened, "opened finger" when the index or middle finger is used with all fingers opened, and "index finger" when only the index finger is used with the thumb folded.

Referring to Table 1 above, in the case of using the right hand or the left hand, when only the index finger is used, the finger position measured by the linear sensor 130 is the most accurate, followed by the open hand and thumb and index finger. In addition, when the user's hand approaches from the center, it may be seen that the finger position is accurately measured regardless of the shape of the hand.

Figure 3:
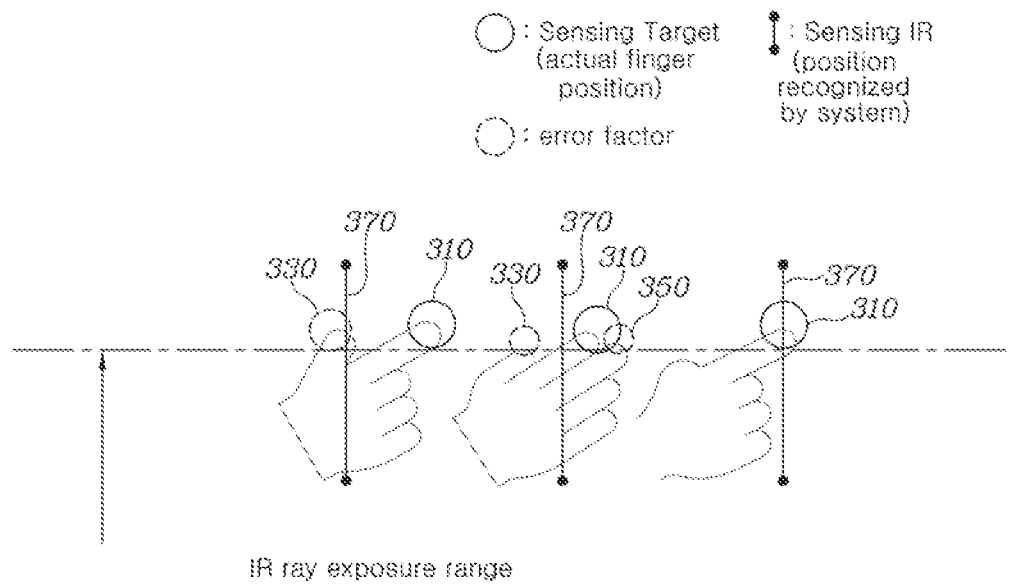
FIG. 3 is an exemplary diagram illustrating error factors causing an inaccurate sensor measurement position in the position detection apparatus in FIG. 1.

FIG. 3 is an exemplary diagram illustrating error factors causing an inaccurate sensor measurement position in the position detection apparatus in FIG. 1.

Referring to FIG. 3, when using the right hand to approach the display part 110 with a finger, the finger position may be accurately measured without any difference between the actual pointing finger position 310 and the finger position 370 recognized by an IR sensor 130, since there is no error factor when approaching using only the index finger. On the other hand, when a finger approaches the display part 110 with an opened finger, the thumb 330 and middle finger 350 may act as the error factor, causing the error between the actual pointing finger position 310 and the finger position 370 recognized by the IR sensor 130. In addition, when the finger is approached to the display part 110 with an opened thumb, the thumb 330 may act as the error factor, causing the error between the actual pointing finger position 310 and the finger position 370 recognized by the IR sensor 130.

Figure 4:
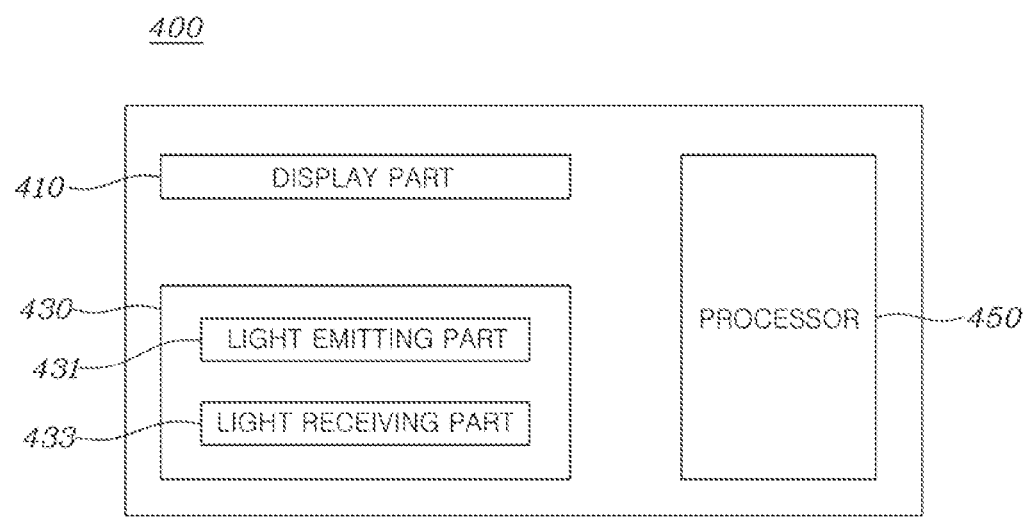
FIG. 4 is a block diagram illustrating a configuration of a position detection apparatus according to an embodiment of the present invention.

FIG. 4 is a block diagram illustrating a configuration of a position detection apparatus 400 according to an embodiment of the present invention.

Referring to FIG. 4, the position detection apparatus 400 according to the present embodiment may include a display part 410, a position detection sensor 430, and a processor 450.

The display part 410 may display information on a screen. For example, the display part 410 may be a display screen of audio, video, and navigation (AVN) system disposed between driver's seat and passenger's seat of a vehicle. For example, the display part 410 may display a navigation screen for guiding directions to a driver in the vehicle.

The display part 410 may be a touch screen that may detect when a user's finger is in contact therewith.

For example, the position detection sensor 430 may use a plurality of linearly disposed infrared (IR) sensors, arranged in parallel with the display part 410 at the bottom of the display part 410 to detect the position or movement of an object approaching the display part 110. The position detection sensor 430 includes a light emitting part 431 that emits infrared ray toward the display part 410 and a light receiving part 433 that receives the infrared ray that is reflected and returns after being emitted. The position detection sensor 430 may detect the position and movement of a finger approaching the display part 410 using the principle that when a finger approaches the upper display part 410, infrared ray emitted by the light emitting part 431 is reflected by the finger detected by the light receiving part 433.

The processor 450 corrects a position error between the display region of the display part 410 and the sensing region of the position detection sensor 430.

Figure 5:
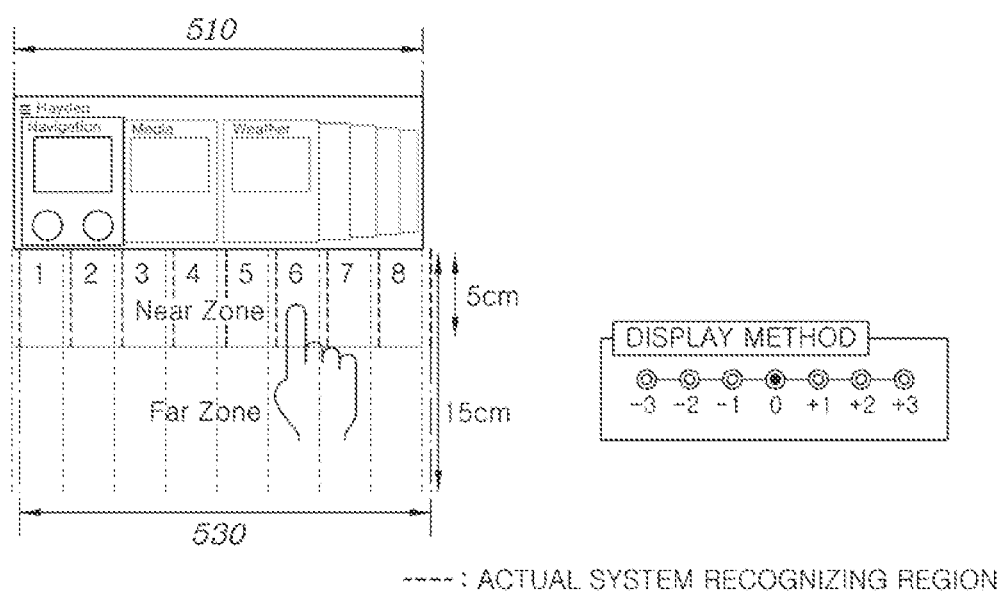
FIG. 5 is an exemplary diagram illustrating a method for correcting a position of a finger measured in an IR sensor using an offset value in the position detection apparatus in FIG. 4.

FIG. 5 illustrates an example in which a position difference occurs between the display region 510 of the display part 410 on which the actual finger is positioned in the position detection apparatus 400 of FIG. 4 and the sensing region 530 of the position detection sensor 430. Referring to FIG. 5, the sensing region 530 of the position detection sensor 430 is located to the right relative to the display part 510 of the display part 410, so that the position detection sensor 430 may recognize a position slightly to the right of the actual position of the user's finger. The processor 450 may increase the accuracy of finger position detection by shifting the sensing region recognized by the position detection sensor 430 by an error between the display part 510 and the sensing region 530.

On the other hand, the position detection sensor 430 may also measure the distance of the user's finger from the display part 410, depending on the type of sensor and settings thereof. For example, the position detection sensor 430 may determine that the user's finger has approached the far zone when it is within 15 cm of the display part 410, and the user's finger has approached the near zone when it is within 5 cm.

The offset value may set to 0.

Referring back to FIG. 4, the processor 450 determines the direction of entry of the finger based on the infrared ray received from the light receiving part 433 and aligns the position of the UI based thereon.

In addition, the processor 450 also corrects for errors in the detected finger position by adjusting the offset value when the actual finger position and the detected position do not match.

Figure 6:
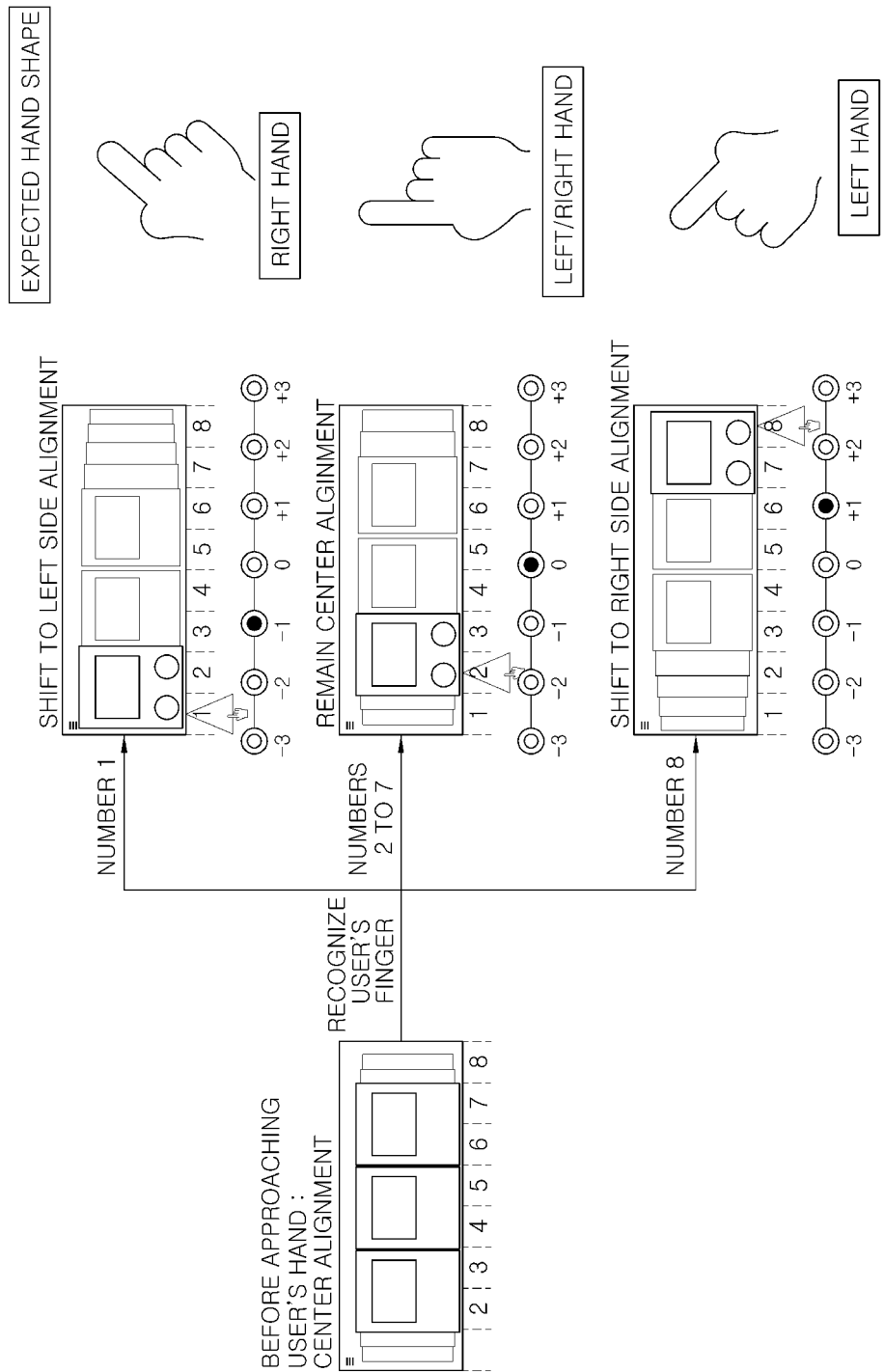
FIG. 6 is an exemplary diagram illustrating a method for setting a UI automatic alignment and offset value based on the direction a user's finger is approaching from the position detection apparatus of FIG. 4.

FIG. 6 is an exemplary diagram illustrating a method for setting a UI automatic alignment and offset value based on the direction a user's finger is approaching from the position detection apparatus 400 of FIG. 4.

Referring to FIG. 6, the processor 450 may dispose center the position of the user menu displayed on the display part 410 before the user's hand approaches, and then change the alignment of the user menu based on the direction from which the user's hand approaches.

The processor 450 may determine the direction in which the user's hand approached based on where the user's finger was first detected.

For example, as shown in FIG. 6, it may be assumed that the screen of the display part 410 is divided into regions 1 to 8 in the direction of the leftmost region to the rightmost region with respect to the horizontal.

The processor 450 may determine that the user's hand approached from the left when the user's finger is first detected in region 1 and may change the user menu to a left-aligned user menu by shifting the position of the center-aligned user menu to the left.

The offset value, which was set to 0 initially, may be set to −1.

In addition, the processor 450 may determine that the user's hand approached from the center when the user's finger is first detected in regions 2 to 7 and may leave the centrally aligned user menu unchanged position.

The offset value that is initially set to 0 may remain unchanged.

In addition, the processor 450 may determine that the user's hand approached from the right when the user's finger is first detected in region 8 and may change the user menu to a right-aligned user menu by shifting the position of the center-aligned user menu to the right.

The offset value, which was set to 0 initially, may set be to +1.

Referring back to FIG. 2, in the case of the user's hand approaches 210, 220, and 230 from the left, the regions 213, 223, and 233 detected by the IR sensor may be recognized as left relative to the actual finger positions 211, 221, and 231.

The processor 450 may correct the position of the user's finger as detected by the position detection sensor 430 based on the offset value.

The processor 450 may determine the region obtained by subtracting an offset value from the detected region as a region where the user's finger is located.

For example, the processor 450 may determine that when the position detection sensor 430 detects that the position of the user's finger located in region 1 and the offset value is −1, then the position of the user's finger located in region 2.

The processor 450 may determine the position of the user's finger located in region 8 when the position detection sensor 430 detects that the position of the user's finger is in region 7 and the offset value is +1.

On the other hand, the processor 450 may perform a calibration mode in which the offset value may be further adjusted.

Figure 7:
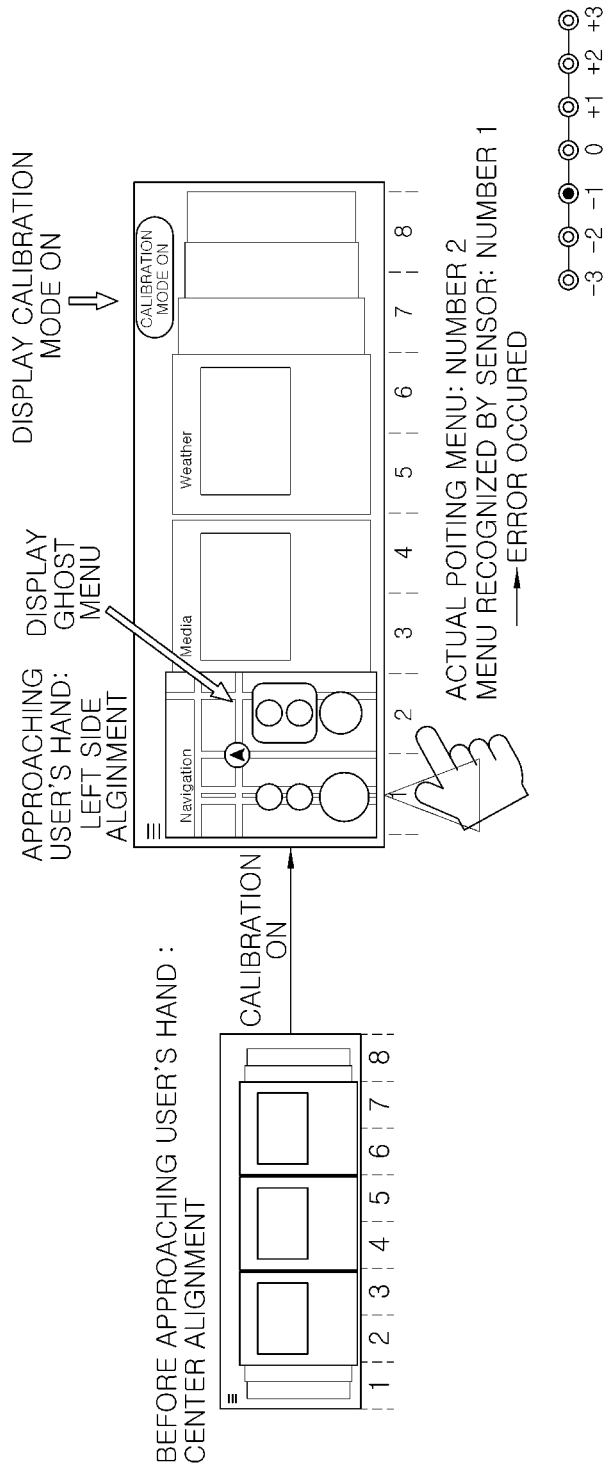
FIG. 7 illustrates an example of a ghost menu being displayed on a screen for setting additional offset values after turning on calibration mode on the position detection apparatus in FIG. 4.

For example, a 'calibration on' menu is displayed in the upper-right screen of the display part 410, as shown in FIG. 7, and when the user touches the 'calibration on' menu, the menu is shaded, and the processor 450 may perform the calibration mode.

When the calibration mode is in the ON state, the processor 450 may control the display part 410 to display a ghost menu icon in a region spaced at least one certain distance to the left or right of the original menu icon displayed on the screen.

Here, the ghost menu icon may be distinguished by using different color from the original menu icon, for example, the original menu icon may be colored in blue, and the ghost menu icons on either side may be colored in gray.

The ghost menu icon may be displayed on the different region adjacent region with respect to the partitioned display part 410. For example, in the case of the original menu icon is displayed on region 4, the ghost menu icons may be displayed on regions 3 and 5.

In the case of the original menu icon is displayed on the edge, the ghost menu icon may only be displayed to one side of the original menu icon. For example, as shown in FIG. 7, when the original menu icon is displayed on region 1, the ghost menu icon may be displayed in region 2.

Here, the processor 450 determines whether the user selected the ghost menu icon instead of the original menu icon, so that the offset value is additionally changed based thereon.

The processor 450 subtracts 1 from the offset value when the user selects the ghost menu icon on the left side and adds 1 to the offset value when the user selects the ghost menu icon on the right side.

For example, in the state where the original menu icon is displayed on region 4 and the ghost menu icons are displayed on regions 3 and 5, 1 may be added to the offset value when the user selects the ghost menu icon located on region 5.

For example, as shown in FIG. 7, in the state where the original menu icon is displayed on region 1 and the ghost menu icon is displayed on region 2, 1 may be subtracted from the offset value when the user selects the ghost menu icon located on region 2.

The selection of the ghost menu icon may be performed by touching the output screen.

Figure 8:
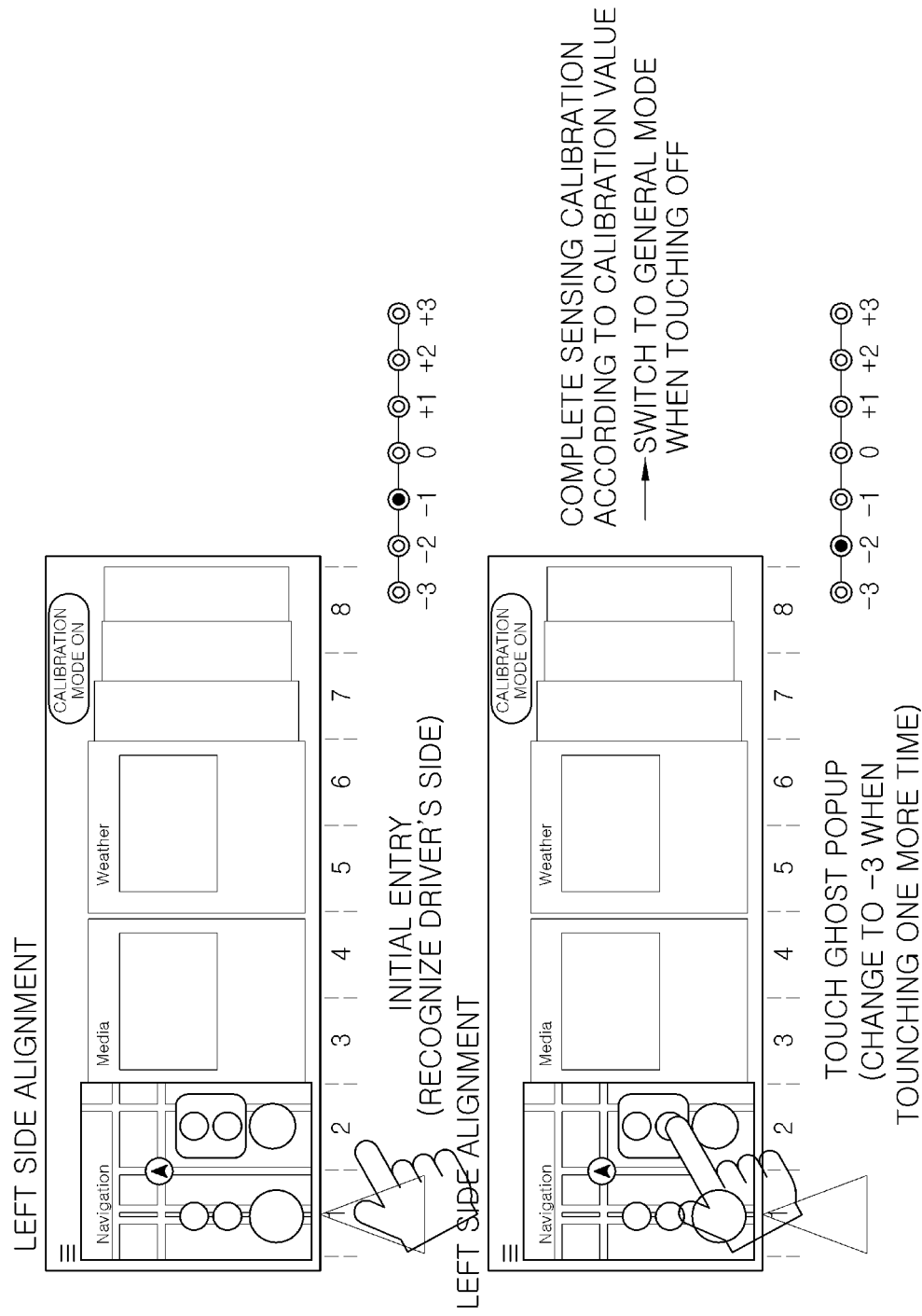
FIG. 8 illustrates an example of a method for setting additionally an offset value by touching a ghost pop-up in the position detection apparatus in FIG. 4.

FIG. 8 illustrates an example of a method for setting additionally an offset value by selecting a ghost pop-up in the position detection apparatus in FIG. 4.

Referring to FIG. 8, the user menu may be aligned on the left side when the user's hand is approached from the left in the display part 410, and the offset value may be changed from 0, which is an initial value, to −1. In the partitioned screen, the original user menu icon is displayed on region 1, and the ghost menu icon may be displayed on region 2, which is located on the right side. When the user selects the ghost menu icon located in region 2, the offset value may be changed from −1 to −2, one step lower. When the user selects the ghost menu icon one more time, the offset value may be changed from −2 to −3, one step lower.

Figure 9:
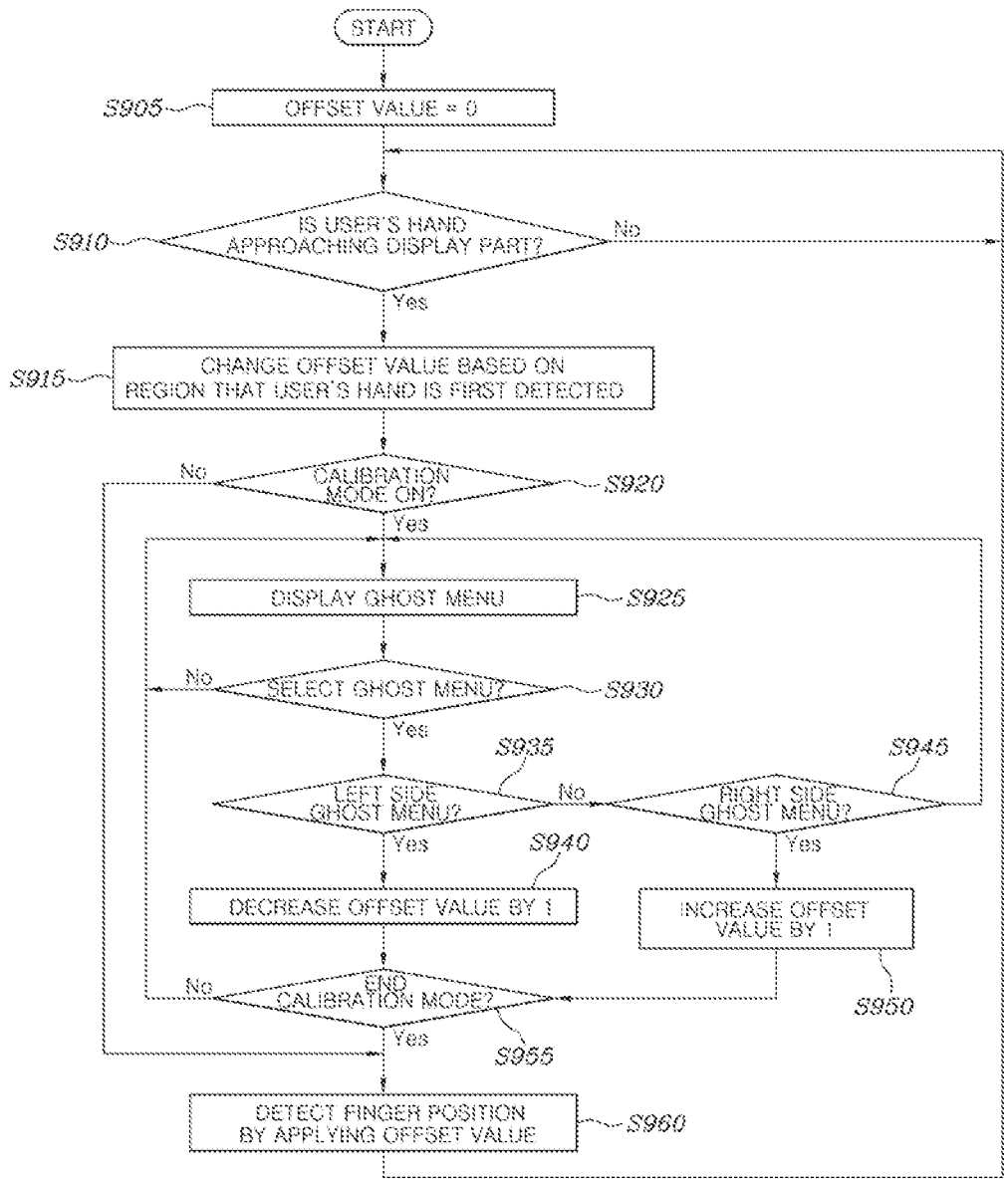
FIG. 9 illustrates a method for recognizing a position of a finger of a position detection apparatus according to an embodiment of the present invention.

FIG. 9 illustrates a method for recognizing a position of a finger of a position detection apparatus 400 according to an embodiment of the present invention. The operations of FIG. 9 may be performed by the processor 450 of the position detection apparatus 400.

Referring to FIG. 9, the position detection apparatus 400 sets an initial offset value 0 (S905) and determines whether a user's hand approaches the display part 410. When the user's hand approaches the display part 410, the position detection apparatus 400 aligns the user menu based on the region in which the user's hand is first detected and changes the offset value set initially (S915). The region in which the user's hand is first detected may be determined based on the screen of the display part 410, which is divided into a plurality of regions in the direction from the leftmost region to the rightmost region with respect to the horizontal.

For example, the display part 410 may be assumed as divided into regions 1 to 8 as shown in FIG. 6.

The position detection apparatus 400 may align the position of the user menu to the left and set the offset value to −1 when the user's finger is first detected in region 1.

In addition, the position detection apparatus 400 maintains the position and offset value of the user menu when the user's finger is first detected in regions 2 to 7.

The offset value that is initially set to 0 may remain unchanged.

In addition, the position detection apparatus 400 may align the position of the user menu to the right and set the offset value to +1 when the user's finger is first detected in region 8.

Next, the position detection apparatus 400 determines whether the calibration mode is ON (S920), and when the calibration is on state, the ghost menu icon is displayed on the screen of the display part 410 (S925).

The ghost menu icon may be displayed with the same design on either side of the original menu icon displayed on the screen.

The ghost menu icon may be distinguished by different colors, for example, the original menu icon may be colored in blue, and the ghost menu icon on either side may be colored in gray.

The ghost menu icon may be displayed on the different region adjacent region with respect to the partitioned display part 410. For example, in the case of the original menu icon is displayed on region 4, the ghost menu icons may be displayed on regions 3 and 5.

In the case of the original menu icon is displayed on the edge, the ghost menu icon may only be displayed to one side of the original menu icon. For example, as shown in FIG. 7, when the original menu icon is displayed on region 1, the ghost menu icon may be displayed in region 2.

Next, the position detection apparatus 400 determines whether the user selected the ghost menu icon (S930).

In the case of the user selects the ghost menu icon, determine whether the icon the user selects is a ghost menu icon on the left side (S935), and in the case of the icon the user selects is a ghost menu icon on the left side, decrease the current offset value by 1 (S940).

On the other hand, based on the result of step S935, when the user-selected icon is not the ghost menu icon on the left side, determine whether the user-selected icon is a ghost menu icon on the right side (S945), and when the user-selected icon is a ghost menu icon on the right side, increase the current offset value by 1 (S950).

After changing the offset value in step S940 or S950, the position detection apparatus 400 determines whether the calibration mode is ended (S955), thereby applying the changed offset value to detect the finger position (S960).

The position detection apparatus 400 may correct the finger position detected from the IR sensor based on the offset value. The position detection apparatus 400 may determine that the region corresponding to the value subtracting the offset value from the value corresponding to the region where the finger detected by the IR sensor is located is the region where the user's finger is located.

For example, the position detection apparatus 400 may determine that the position of the user's finger is in region 1 when the position detection sensor 430 detects that the position of the user's finger is in region 2 and the offset value is −1.

In addition, for example, the position detection apparatus 400 may determine that the position of the user's finger is in the region 8 when the position detection sensor 430 detects that the position of the user's finger is in region 7 and the offset value is +1.

On the other hand, based on the result of step S955, when the calibration mode is not ended, the position detection apparatus 400 continues to display the ghost menu icon on the display part 410 (S925) and determines whether the user has selected the ghost menu icon (S930).

According to embodiments of the present invention described above may provide an algorithm that automatically corrects an error between a recognized and actual position when recognizing a region touched by a user on a touch screen.

In addition, the algorithm, which may accurately measure the position of a finger changing according to the shape of the user's hand when various users operate the touch screen, may be provided.

In addition, a technology that corrects a sensing region that changes according to a driver and a passenger when operating a touch screen in a vehicle may be provided.

The present invention mentioned in the foregoing description may be implemented as code that can be written to a computer-readable recording medium and can thus be read by a computer system. The computer-readable medium may include all kinds of recording devices in which data readable by a computer system is stored. Examples of computer-readable medium includes hard disk drive (HDD), solid state disk (SSD), silicon disk drive (SDD), ROM, RAM, CD-ROM, magnetic tape, floppy disk, optical data storage device, and the like. Therefore, the above embodiments are therefore to be construed in all aspects as illustrative and not restrictive. The scope of the present invention should be determined by the appended claims and their legal equivalents, not by the above description, and all changes coming within the meaning and equivalent range of the appended claims are intended to be embraced therein.

What is claimed is:

1. A method for detecting a position of an object approaching a display, comprising:
   resetting a preset offset value based on a detection region in which the object approaching the display is first detected among a plurality of detection regions predetermined by a sensor having a sensing element linearly disposed in parallel with the display;
   displaying at least one ghost menu icon around an original menu icon on the display screen in response to determining whether a calibration mode is ON;
   determining whether the ghost menu icon has been selected by a user;
   increasing or decreasing, when the ghost menu icon is selected by the user, the reset offset value based on the position of the selected ghost menu; and
   correcting a position of the object detected by the sensor based on the increased or decreased reset offset value.

2. The method of claim 1, wherein the ghost menu is displayed in at least one region to the left side or right side of the original menu icon.

3. The method of claim 1, wherein, in the resetting the offset value, in a case of the detection region in which the object is first detected being located in the leftmost region of the plurality of detection regions, the offset value is set to −1.

4. The method of claim 1, wherein, in the resetting the offset value, in a case of the detection region in which the object is first detected being located in the rightmost region of the plurality of detection regions, the offset value is set to +1.

5. The method of claim 1, wherein, in the increasing or decreasing the reset offset value, in a case of the selected ghost menu icon being located to the left of the original menu icon, the reset offset value is decremented by 1.

6. The method of claim 1, wherein, in the increasing or decreasing the reset offset value, in a case of the selected ghost menu icon being located to the left of the original menu icon, the reset offset value is incremented by 1.

7. The method of claim 1, wherein, in the correcting the position of the object, a region corresponding to a value obtained by subtracting the increased or decreased offset value from the value corresponding to the sensing region in which the object is detected in the sensor is determined as the region in which the object is located.

8. The method of claim 1, further comprising:
   shifting a position of the user menu based on the detection region in which the object is first detected when the object approaches the display screen.

9. The method of claim 8, wherein, in the shifting a position of the user menu, in a case of the detection region in which the object is first detected being located in the leftmost region of the plurality of detection regions, the user menu is shifted toward the left side of the display screen.

10. The method of claim 8, wherein, in the shifting a position of the user menu, in a case of the detection region in which the object is first detected being located in the rightmost region of the plurality of detection regions, the user menu is shifted toward the right side of the display screen.

11. A position detection apparatus, comprising:
   a display part displaying information on a screen;
   a sensor arranged in parallel with the display part, the sensor including a sensing element configured for detecting a position of an object approaching the display part among a plurality of detection regions preset in the sensor, wherein the sensor is disposed linearly with respect to the display part; and
   a processor configured for:
      resetting a preset offset value based on one of the detection regions, among the plurality of detection regions, in which the object is first detected when the object approaches the display part;
      determining whether a calibration mode is in an ON state;
      displaying at least one ghost menu icon around the original menu icon on the display screen in response to determining that the calibration mode is in the ON state;
      determining whether the ghost menu icon is selected by a user, increasing or decreasing, when the ghost menu icon is selected by user, the reset offset value based on a position of the selected ghost menu icon; and
      correcting a position of the object detected by the sensor based on the increased or decreased reset offset value.

12. The apparatus of claim 11, wherein the ghost menu is displayed in at least one region to the left side or right side of the original menu icon.

13. The apparatus of claim 11, wherein the processor, in a case of the detection region in which the object is first detected being located in the leftmost region of the plurality of detection regions, sets the offset value to −1.

14. The apparatus of claim 11, wherein the processor, in a case of the detection region in which the object is first detected being located in the rightmost region of the plurality of detection regions, sets the offset value to +1.

15. The apparatus of claim 11, wherein the processor, in a case of the selected ghost menu icon being located to the left of the original menu icon, subtracts 1 from the reset offset value.

16. The apparatus of claim 11, wherein the processor, in a case of the selected ghost menu icon being located to the left of the original menu icon, adds 1 to the reset offset value.

17. The apparatus of claim 11, wherein the processor is configured to determine a region where the object is located as a region corresponding to a value obtained by subtracting the increased or decreased offset value from a value corresponding to a sensing region where the object is detected by the sensor.

18. The apparatus of claim 11, wherein the processor is configured to shift a position of the user menu based on a detection region in which the object is first detected when the object approaches the display screen.

19. The apparatus of claim 18, wherein the processor is configured to shift the user menu to the left side of the display screen when the detection region in which the object is first detected is located in the leftmost region of the plurality of detection regions.

20. The apparatus of claim 18, wherein the processor is configured to shift the user menu to the right side of the display screen when the detection region in which the object is first detected is located in the rightmost region of the plurality of detection regions.

* * * * *